(No Model.) 2 Sheets—Sheet 1.

A. H. HUTH.
SPRING METAL TIRE.

No. 598,994. Patented Feb. 15, 1898.

Witnesses.
E. A. Balloch
B. W. Miller

Inventor.
Alfred Henry Huth
By his Attorneys
Baldwin Davidson Wight

THE NORRIS PETERS CO., PHOTO-LITHO., WASHINGTON, D. C.

(No Model.) 2 Sheets—Sheet 2.

A. H. HUTH.
SPRING METAL TIRE.

No. 598,994. Patented Feb. 15, 1898.

Witnesses.
E. A. Ballock
B. W. Miller

Inventor.
Alfred Henry Huth
By his Attorneys
Baldwin Davidson Wight

UNITED STATES PATENT OFFICE.

ALFRED HENRY HUTH, OF LONDON, ENGLAND.

SPRING-METAL TIRE.

SPECIFICATION forming part of Letters Patent No. 598,994, dated February 15, 1898.

Application filed May 17, 1897. Serial No. 636,958. (No model.)

*To all whom it may concern:*

Be it known that I, ALFRED HENRY HUTH, esquire, a subject of the Queen of Great Britain, residing at Bolney House, Ennismore Gardens, London, in the county of Middlesex, England, have invented certain new and useful Improvements in Spring-Tires Applicable to the Wheels of Bicycles, Carriages, Carts, Motor-Cars, or any Road-Vehicle, of which the following is a specification.

My invention relates to spring-metal tires applicable to the wheels of bicycles, carriages, carts, motor-cars, or any road-vehicle.

These tires consist of a series of spring-shoes arranged around the rim of the wheel. The shoes each consist of a tread or bearing part which runs on the road and springs on either side, which connect the tread with the rim of the wheel. Preferably the tread and the side springs are formed together from a piece of thin sheet metal. To give sufficient flexibility to the sides of the shoe, the sheet metal is bent to a C curve. Sometimes the two sides of the shoe are supported by auxiliary springs to give additional lateral stiffness. The side springs are so formed as to leave sufficient space for the escape of any grit or small stones that may enter.

Figure 3:
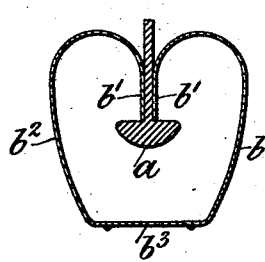
Figure 2:
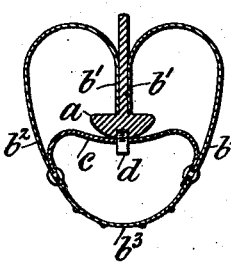
Figure 4:
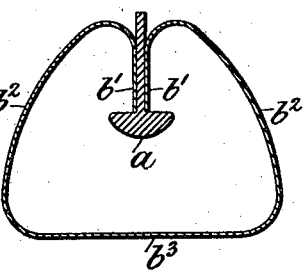
Figure 1:
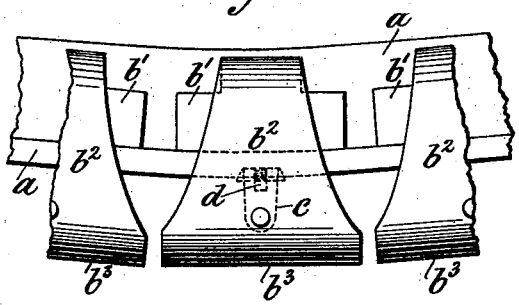
Figure 5:
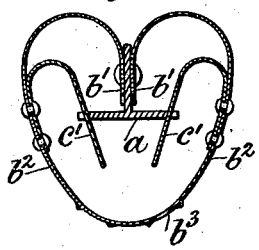
Figure 5:
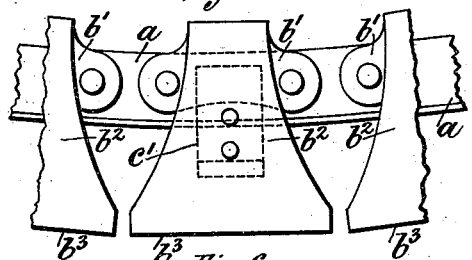
Figure 6:
Figure 6:
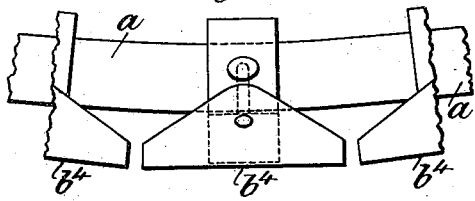
Figure 7:
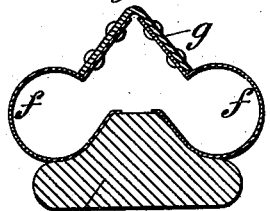
Figure 7:
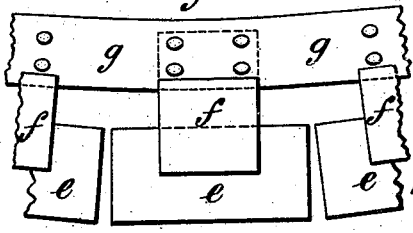

In the annexed drawings, Figure 1 is a side view of a portion of the rim of a wheel furnished with spring-shoes in accordance with my invention. Fig. 2 is a transverse section of the same. Figs. 3 and 4 show in transverse section modified forms. Figs. 5, 6, and 7 are side views of other modifications; and Figs. $5^a$, $6^a$, and $7^a$ are the respective transverse sections.

Referring to Figs. 1 to 4, $a$ is a portion of a rigid ring forming the rim of the wheel.

$b'$ $b^2$ $b^3$ are the shoes. These are preferably each formed of a single piece of sheet-steel of a suitable spring temper. The shoes, at their extremities, are formed with palms $b'$, which are applied to the rim $a$ on the two sides and are firmly fixed to the same, preferably by rivets. The two sides $b^2$ $b^2$ of the shoe are bent to a form such as to render them sufficiently flexible radially. They extend from the rim upward, as they appear in the figures. They then curve around with a semicircular bend and pass down into the tread $b^3$ beneath the rim. The shoe is symmetrical on the two sides of the rim.

At the tread only a narrow space is provided between shoe and shoe; but nearer to the rim the spaces become larger and will allow any matter which may make its way into the interior of the shoes to escape readily. When the shoe is rounded on the under side or tread, as in Fig. 2, I provide a spring-stay $c$, also of sheet-steel, to stiffen the shoe laterally. The stay is riveted at its ends to the shoe. It is perforated in the center, and a pin $d$, fixed in the rim $a$, enters into this perforation. When the shoe is flat in the tread, the stay and pin may be omitted, as in Figs. 3 and 4. The shoe itself may be roughened on the under side, as is shown in Figs. 1 and 2, or a roughened wearing-piece may be fixed onto the shoe.

In Figs. 5 and $5^a$ the rim of the wheel and the shoes are as before; but in this case the additional lateral stiffness is given by the springs $c'$ $c'$, which are fixed to the sides of the shoe and bear against the rim.

In Figs. 6 and $6^a$ the rim is of another form, and the shoes have each an outer tread-piece $b^4$ fixed upon them.

In Figs. 7 and $7^a$ the shoe is formed of separate pieces. A block $e$, of india-rubber or such like material, forms the tread, and sides $ff$, of sheet metal, connect the tread with the rim $g$.

In each form of my improved tire the portions of the springs attached to the rims are parallel to tangents of the rim.

What I claim is—

1. The combination, substantially as set forth, of a rigid rim and a series of shoes each independent of the other, and having spaces between them at their ends, and each consisting of an outer tread part adapted to bear directly on the path traversed and springs on either side connecting the tread with the rim, the portions of the springs attached to the rim being parallel to tangents thereof and curving upward and outward from it and then downward to the tread.

2. The combination, substantially as set forth, of a rigid rim and a series of spring-shoes of sheet metal, each independent of the other, having spaces between them at their ends, and having curved sides connecting the tread of the shoes with the rim, said tread portion being adapted to bear directly on the path traversed and the portions of the curved sides attached to the rim being parallel to tangents of the rim and curving upward and outward from it and then downward to the tread.

3. The combination, substantially as set forth, of a rigid rim and a series of sheet-metal shoes, each independent of the other, with spring-stays forming an additional connection between the shoes and the rim.

ALFRED HENRY HUTH.

Witnesses:
EDMUND S. SNEWIN,
WM. O. BROWN.